J. WEAVER, Jr.
Corn Planter.
No. 79,038.
Patented June 16, 1868.
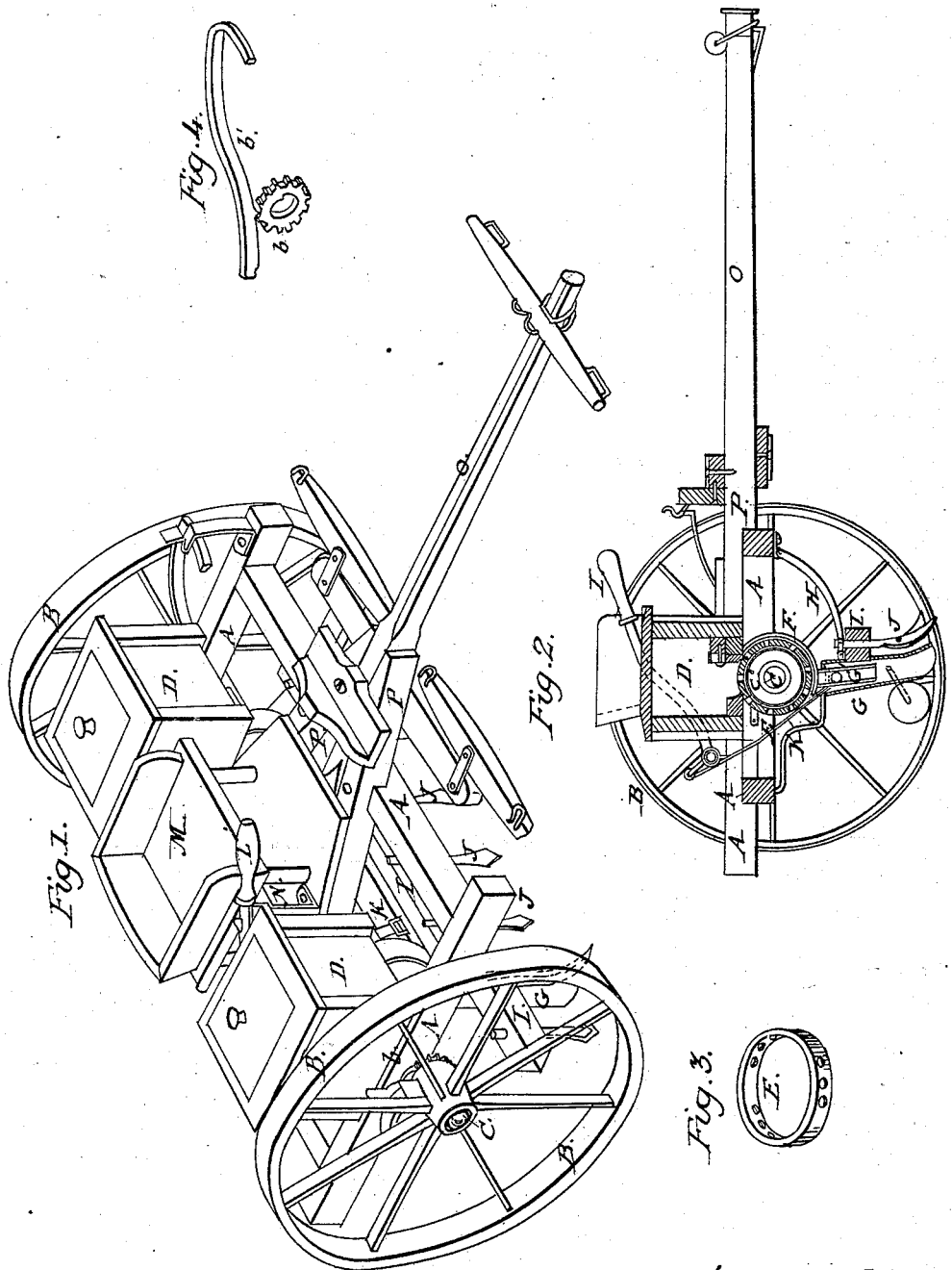
WITNESSES:
N. B. Smith
Alex. Mahon.
INVENTOR:
Jacob Weaver Jr
by O. M. Smith Atty.

United States Patent Office.

JACOB WEAVER, JR., OF ELIZABETHVILLE, PENNSYLVANIA.

Letters Patent No. 79,038, dated June 16, 1868.

---

IMPROVEMENT IN CORN-PLANTER AND SEED-DRILL.

---

The Schedule referred to in these Letters Patent and making part of the same.

---

TO ALL WHOM IT MAY CONCERN:

Be it known that I, JACOB WEAVER, Jr., of Elizabethville, county of Dauphin, and State of Pennsylvania, have invented certain new and useful Improvements in Corn-Planter; and I do hereby declare the following to be a full, clear, and exact description of the same, reference being had to the accompanying drawings, making a part of this specification, in which—

Figure 1 is a perspective view of a machine embracing my improvements.

Figure 2 is a longitudinal section of the same, taken through one of the seed-boxes, and showing the arrangement of the seed-wheel, seed-tube, &c.

Figure 3 is a perspective view of one of the seed-rings detached, and

Figure 4 is a similar view of the stop or brake-lever and ratchet-wheel.

Similar letters of reference denote corresponding parts in all the figures.

My invention consists in a novel arrangement of the tooth or cultivator-bar, and the lever for operating the same, in connection with the seed-tubes and seed-wheels, and the particular devices for stopping the operation of the machine, as hereinafter described.

To enable others to understand and use my improvements, I will proceed to describe the same with reference to the drawing.

The frame A of the machine may be made in any desired form or manner, and of any suitable material. I have shown it made in rectangular form, of stout bars framed together, and supported on two carrying and driving wheels, B B, mounted upon the main axle C. Seed-boxes or hoppers, D D, of any desired form, are mounted upon frame A, over the axle C, and are provided with openings in the bottom, through which the seed is permitted to pass to the surface of the seed-rings or wheels E, mounted on the axle, or on hubs, C', attached to and turning with the axle, as hereinafter described.

The wheels B are loose upon the axle C, and are connected thereto by rag or ratchet-wheels $b$, keyed to the axle and pawls attached to the wheels B, engaging with said ratchet-wheels.

A toothed lever, $b'$, arranged on one side, and operated by the driver, engages with the teeth of one of these rag-wheels, when it is desired to lock the axle and prevent its rotation.

The seed-rings E may be wrought or cast either whole, as shown in fig. 3, or in sections, the latter being preferred for convenience in removing and replacing without removing or displacing other parts of the machine. The rings or sections are perforated, that shown in the sectional view, fig. 2, being perforated in such manner as to adapt it to depositing the seed in rows or drills, while that shown in fig. 3 is adapted to the dropping of corn or other seed which it is desired to plant in hills.

The rings or sections are fastened by screws or otherwise to the hubs C', which serve to form a bottom to the perforations in the rings, and to hold the seed until, by the rotation of said rings and hubs, the seed-perforations or cups are inverted and the seed is discharged.

A cap or guard, F, attached to the bottom of the hopper, or to the frame A, serves to prevent the grain from being discharged until the cups or perforations containing the same reach the proper point of delivery over the seed-tubes or conductors G G' arranged underneath the same.

The seed-tubes G, of which any desired number may be used, according to the character of the work, are of the usual construction, and are connected to the forward part of the frame A by drag-bars or links H, hinged or pivoted to said frame in such manner as to admit of the adjustment of the seed-tubes. The bars or links H also afford a support to a cultivator-bar or frame, I, attached to and adjustable with the rear ends of said links. The bar or frame I is armed with a series of cultivators or cultivator-teeth, J, (see figs. 1 and 2,) arranged in advance of the seed-tubes, and with the points extending slightly below the points of said tubes in such manner as to form a furrow for and to clear the way for the latter, and thereby prevent the liability of said tubes being caught or broken by obstructions, and also serving to more thoroughly prepare the ground for the reception of the seed.

The seed-tubes G and cultivator-frame are connected by a cord or chain, K, with an angular lever, L, mounted on the main frame in rear of the seed-hopper, and extending forward to a point within convenient reach of the driver on seat M, by means of which the driver can readily raise the seed-tubes and cultivator-teeth out of the ground for passing an obstruction or for transportation from one place or field to another. A roller or rollers attached to the tubes or cultivator-bar regulates the depth of the furrows and steadies the movement of the teeth. A catch or latch, N, serves to hold the lever when the seed-tubes and cultivator are raised for transportation.

O represents the tongue of the machine connected by hounds P, or in other suitable manner, with the frame A.

The operation of the several parts will be readily understood from the foregoing description of the construction and arrangement of the parts, and need not be further described. It will be also understood that where the machine is used for drilling grain, the seed-hopper may be extended the entire width of the frame A, and provided with a hopper-bottom, or a number of perforations therein, corresponding to the number of seed-wheels or rings employed. The seed-wheel or hub also may be made continuous, extending the entire distance between the opposite side-bars of the main frame, and the rings made in sections, as explained, may be attached thereto at the required distance apart.

Having now described my invention, what I claim as new, and desire to secure by Letters Patent, is—

1. The seed-tubes and cultivator-bar or frame I, provided with the teeth J, in combination with the frame A, lifting-lever L, and seed-wheels or rings E, all arranged and operating as described.

2. The arrangement of the rag-wheel or ratchet $b$ on the axle, in combination with the toothed lever or brake $b'$, operating as described.

JACOB WEAVER, Jr.

Witnesses:
GEORGE GILBERT,
JOHN K. ENTERLINE.